A. G. ELVIN AND A. B. FAHNESTOCK.
MECHANICAL STOKER SHOVEL.
APPLICATION FILED DEC. 28, 1918.
1,304,464.
Patented May 20, 1919.
2 SHEETS—SHEET 1.
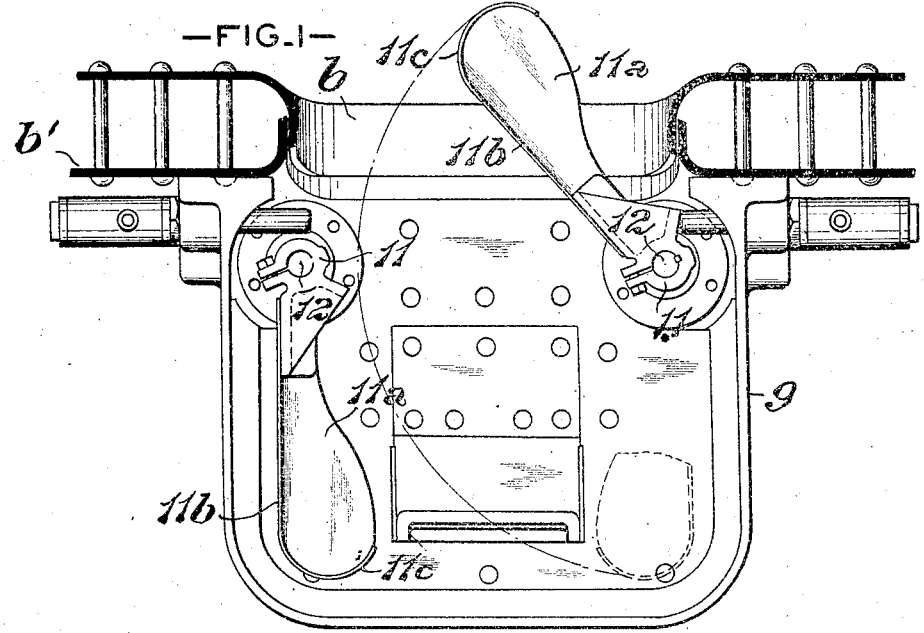
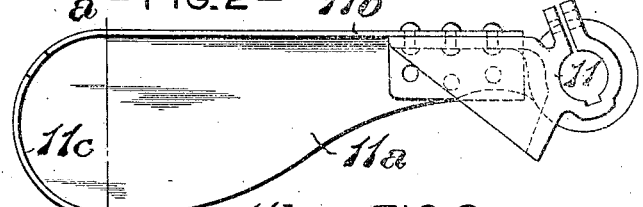
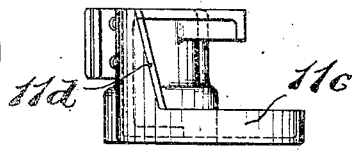
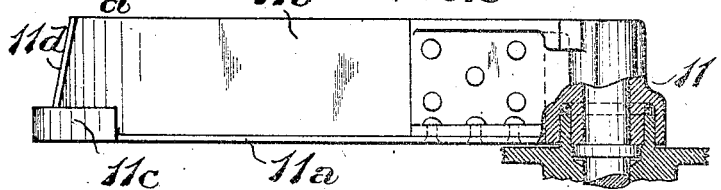
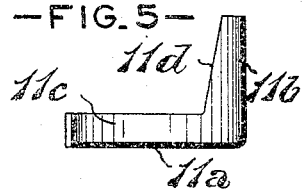
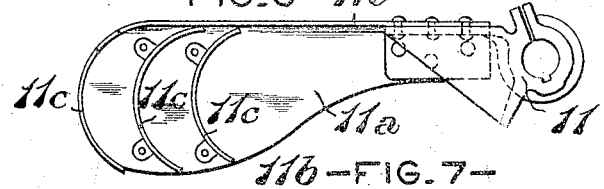
WITNESSES
Edward H. Wright
S. R. Bell
INVENTORS
Albert G. Elvin
Adam B. Fahnestock

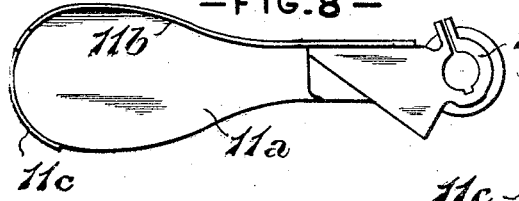
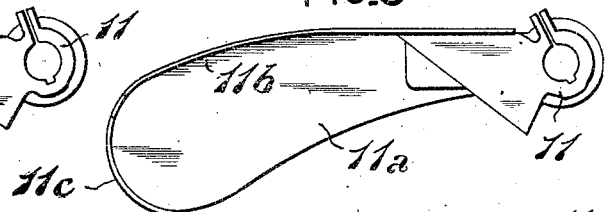
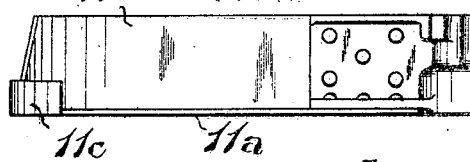
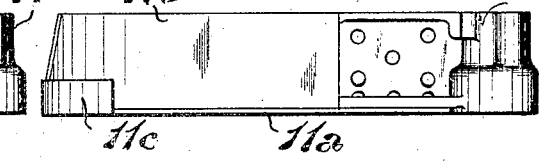
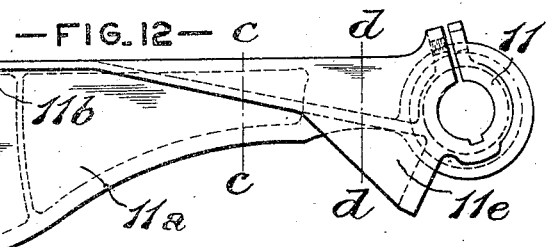
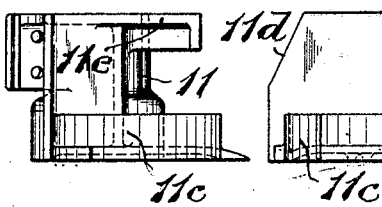
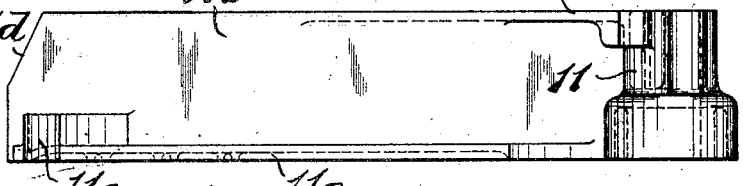
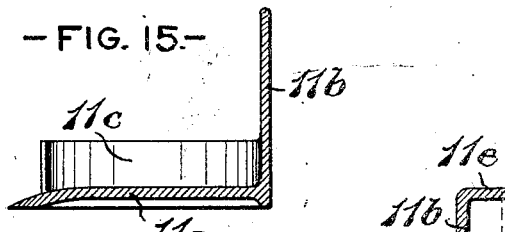
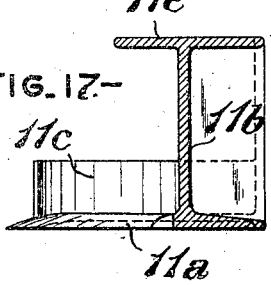
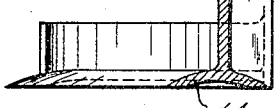

UNITED STATES PATENT OFFICE.

ALBERT G. ELVIN, OF PLANDOME, AND ADAM B. FAHNESTOCK, OF GREAT NECK, NEW YORK; SAID FAHNESTOCK ASSIGNOR TO SAID ELVIN.

MECHANICAL-STOKER SHOVEL.

1,304,464.  Specification of Letters Patent.  Patented May 20, 1919.

Application filed December 28, 1918. Serial No. 268,637.

*To all whom it may concern:*

Be it known that we, ALBERT G. ELVIN, of Plandome, in the county of Nassau and State of New York, and ADAM FAHNESTOCK, of Great Neck, in the county and State aforesaid, have jointly invented a certain new and useful Improvement in Mechanical-Stoker Shovels, of which improvement the following is a specification.

Our invention relates to vibratory fuel carrying and throwing shovels, for application in mechanical stokers of the type in which fuel is projected into a steam boiler furnace by shovels so operating, an instance of which type is exemplified in Letters Patent of the United States No. 1,058,356, granted and issued to Albert G. Elvin aforesaid, under date of April 8, 1913.

The object of our invention is to provide a mechanical stoker shovel, of the general character above stated, which shall be adapted to deliver fuel to a furnace or firebox, in different quantities, as from time to time desired, and to distribute it to different desired portions of said furnace.

The improvement claimed is hereinafter fully set forth.

In the accompanying drawings: Figure 1 is a plan or top view of the shovel box of a mechanical stoker, with the cover removed, illustrating the application of two shovels embodying our invention; Fig. 2, a plan or top view, on an enlarged scale, of a shovel; Fig. 3, a side view, of the same; Fig. 4, an end view, as seen from the left; Fig. 5, a vertical transverse section on the line $a\ a$ of Fig. 2; Fig. 6, a plan view of a shovel illustrating a structural modification; Fig. 7, a side view of the same; Figs. 8 and 9, plan or top views, illustrating other structural modifications; Figs. 10 and 11, side views of the shovels shown in Figs. 8 and 9, respectively; Fig. 12, a plan or top view of a shovel, illustrating a further structural modification; Fig. 13, a side view of the same; Fig. 14, an end view, as seen from the left, and; Figs. 15, 16 and 17, transverse sections, on the lines $b\ b$, $c\ c$, and $d\ d$, respectively, of Fig. 12.

In the practice of our invention, we provide a fuel carrying and throwing shovel comprising a stock or body, 11, through which the complete shovel is adapted to be connected to a shovel shaft; a blade or bottom plate, $11^a$, rigidly secured to, or formed integral with, the body, and projecting therefrom at substantially a right angle to its axis, said bottom plate increasing in width from the body to its outer end; and a back plate, $11^b$, projecting upwardly from the blade, $11^a$. The surface of the bottom plate is flat, throughout its length, and that of the back plate extends from the body to the outer or free end portion of the shovel, either in a plane which is flat, as shown in Figs. 1, 2, 6, and 12, or is curved, as shown in Figs. 8 and 9. The outer end portion of the back plate is segmentally curved, in an arc which terminates at the front of the bottom plate, about in line, transversely, with the commencement of the segmental end curvature of the back plate.

The height of the segmentally curved end portion of the back plate, above the bottom plate, is materially less than that of the main body of the back plate, for the major part of the entire length of the curved end portion thereof, the portion of reduced height being provided to form a vane, $11^c$, the function of which will be presently described. The edge, $11^d$, of the back plate, which extends from its top to the top of the vane, is inclined inwardly and upwardly, as shown in Figs. 4 and 5 and others. Under certain conditions, a plurality of vanes, $11^c$, may be found desirable, and a shovel having three vanes is shown in Figs. 6 and 7. The back plate may be curved between the body of the shovel and the outer end portion thereof, as shown in Figs. 8 and 9.

Figs. 12 to 17, inclusive, illustrate a shovel designed to permit adjustment of its back plate, in accordance with varying conditions. A top plate, $11^e$, extends inwardly from the back plate, from the body, 11, toward the curved end portion of the back plate, tangentially to the axis of the body, and the back plate is made, originally, straight, for a portion of its length adjoining its outer end, as shown in Fig. 12, and is thereafter bent to any desired curvature and secured, as by welding, to the bottom plate. The inclined back plate has the effect of moving the fuel forward on the bottom plate, as it is picked up by the shovel.

In the application of our invention in mechanical stokers of the type for which it is designed, to wit: that set forth in Letters Patent No. 1,058,356 aforesaid, two shovels are fixed on shovel shafts, 12, 12, located in a shovel box, 9, adjacent to, and on opposite sides of, the fire door opening, $b$, of the back head, $b'$, of a steam boiler, firebox, as shown in Fig. 1, and are swung from the inward position shown at the left to the outward position at the right, and vice versa, by suitable operating mechanism. Said operating mechanism does not form part of our present invention, and need not therefore be herein described, further than to note that it is so constructed as to effect a rapidly accelerating movement of each shovel, after it has picked up a charge of fuel from the shovel box, and in its movement from its position of rest, as at the left, to that of discharge of the fuel into the firebox, as at the right. The centrifugal force generated by the rapid movement of the shovels causes the fuel to be projected therefrom into the firebox, and the distribution of the fuel therein is regulated by the speed of the shovels, the form of the curved end portions and vanes of their back plates, and the angle of the inclined edge of the back plate, from its top to the top of the vane.

Variation of the height of the vane, $11^c$, will vary the quantity of fuel held on the bottom plate, to fire, within determined limits, the rear corners of the firebox, and the fuel held by the vane does not leave the shovel until the shovel is suddenly stopped at the end of its outer stroke, in which position the chord of the arc, through which the vane extends, is practically parallel with the back sheet of the firebox, as indicated in Fig. 1. As the shovel swings about the axial line of its shaft, after picking up its charge of fuel, the fuel slides forward along the back, and begins to fly off the inclined edge, $11^d$, the angle of which prevents the fuel from being thrown off in one place, and distributes or sprays it over the firebox, to the limit of the projecting capacity of the shovel.

When applied in mechanical stokers operating in connection with fireboxes of comparatively large width, it may be desirable to provide more than one vane, in order to vary the quantity of fuel to be held on the bottom plate, for properly filling the rear corners of the firebox or across its rear portion. A shovel of such construction having three independent vanes, is shown in Figs. 6 and 7.

We claim as our invention and desire to secure by Letters Patent:

1. A mechanical stoker shovel comprising a stock or body; a bottom plate projecting therefrom; and a back plate projecting upwardly from the bottom plate; and having a curved vane, of relatively reduced height, at its outer end.

2. A mechanical stoker shovel comprising a stock or body; a bottom plate projecting therefrom; and a back plate projecting upwardly from the bottom plate, and having a curved vane, of relatively reduced height at its outer end, the edge of the back plate being outwardly and downwardly inclined, from its top to the top of the vane.

3. A mechanical stoker shovel comprising a stock or body; a bottom plate projecting therefrom; a back plate projecting upwardly from the bottom plate, and having a curved vane, of relatively reduced height, at its outer end; and a top plate extending inwardly from the back plate, from the body toward the outer end of the back plate, substantially tangentially to the axis of the body.

ALBERT G. ELVIN.
ADAM B. FAHNESTOCK.

Witnesses:
FRANK H. CLARK,
E. GOODMAN.